United States Patent Office 3,130,978
Patented Apr. 28, 1964

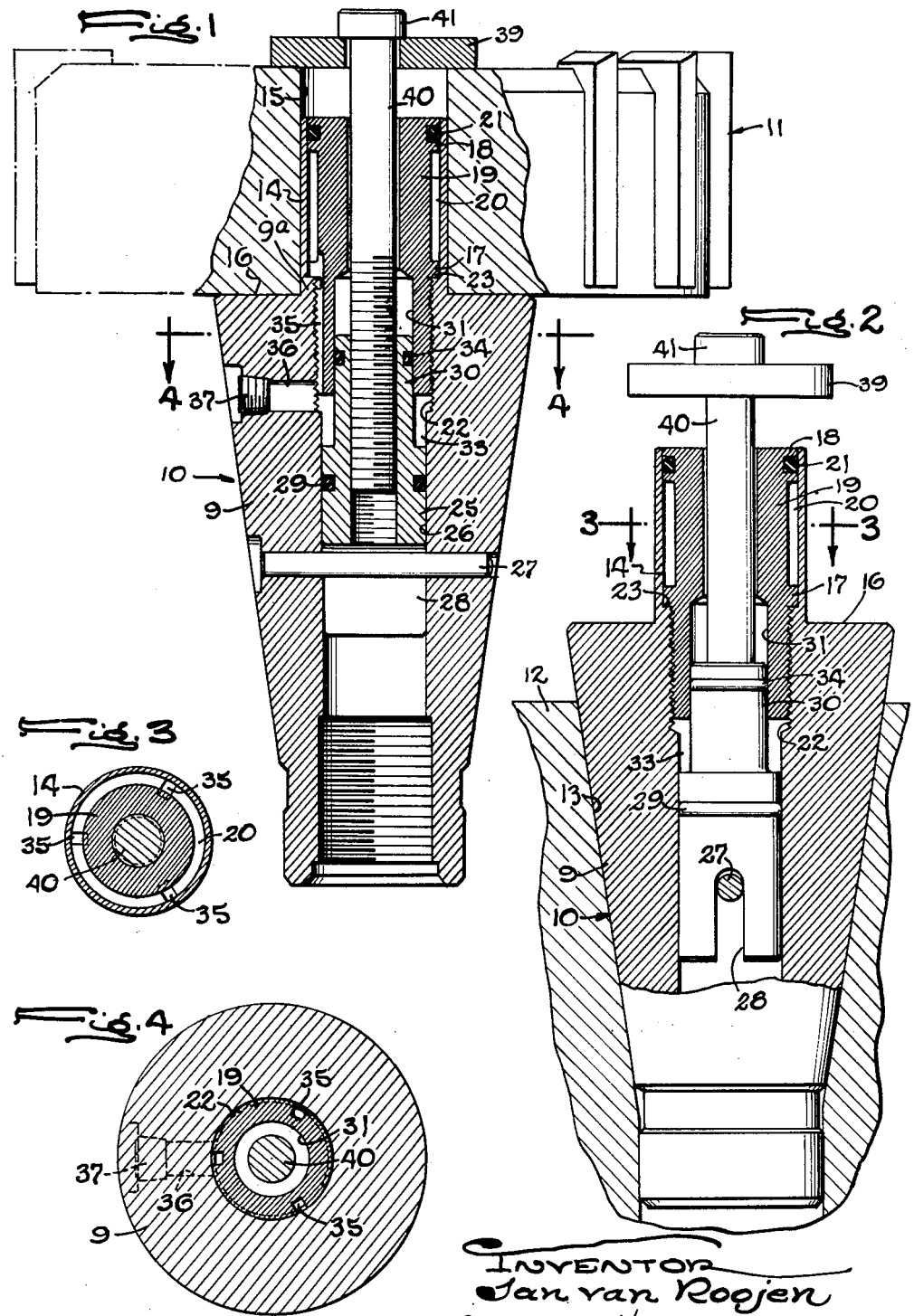

3,130,978
EXPANSIBLE MANDREL
Jan van Roojen, Rockford, Ill., assignor to The Ingersoll Milling Machine Company, Rockford, Ill., a corporation of Illinois
Filed July 31, 1961, Ser. No. 128,009
6 Claims. (Cl. 279—4)

This invention relates to a rotary mandrel for supporting a ring such as a workpiece or cutter and having a flexible walled sleeve telescoped with the ring and, after the ring has been located axially in a desired position, is expanded by applying a uniformly distributed pressure to the ring through the medium of a relatively noncompressible but flowable material, hereinafter referred to for convenience as a "liquid."

The primary object is to provide a mandrel of the above character having a single actuator acting in a novel manner to exert an endwise clamping pressure and also deriving radial pressure for expanding the mandrel and centering the ring thereon.

A more detailed object is to incorporate in the mandrel a member which moves axially first to apply the endwise clamping force and then in its continued movement shifts a piston and cylinder relative to each other to force liquid into a chamber for expanding the mandrel radially.

The invention also resides in the novel manner of utilizing a simple screw and nut mechanism to successively clamp the ring and derive the expanding pressure.

Other objects and advantages of the invention will become apparent from the following detailed description taken in connection with the accompanying drawings, in which FIGURE 1 is a longitudinal sectional view of a mandrel embodying the novel features of the present invention.

FIG. 2 is a similar section taken in the perpendicular plane and showing the manner of mounting the mandrel.

FIG. 3 is a section taken along the line 3—3 of FIG. 2.

FIG. 4 is a section taken along the line 4—4 of FIG. 1.

In the drawings, the invention is shown for purposes of illustration incorporated in a first tubular member in the form of a mandrel 10 for supporting a ring such as the body of a milling cutter 11 and securing the same to the outer end of a rotary spindle 12 with the cutter centered accurately on the spindle axis. When attached to the cutter, as shown in FIG. 1, the mandrel provides a tapered tubular shank 9 adapted to fit into the usual conical seat 13 in the end of the spindle.

The cutter is supported on a sleeve 14 which projects from the outer end of the mandrel and is somewhat shorter than the central bore 15 of the cutter body with which the sleeve telescopes closely when the body is pressed axially against a shoulder 16 on the mandrel. Herein the sleeve is formed integral with the shank of the mandrel and fits closely around and is supported by external flanges 17 and 18 axially spaced apart along the outer end portion of a second tubular member in the form of a plug 19. The plug and sleeve thus define an annular chamber 20 which is tightly closed at its outer end by a suitable seal ring 21 disposed in a groove in the outer flange 18.

The inner end portion of the plug is threaded externally and screwed into an internal thread 22 of a hollow shank portion of the mandrel. The flange 17 is thus brought into abutment with a shoulder 23 near the inner end of the sleeve 14 and formed on a solid cylindrical extension 9a of the mandrel, which extension fits closely within the inner end of the cutter ring. Thus mounted, the sleeve is sufficiently rigid to support the cutter properly when the radial thickness of the sleeve is small enough to allow some outward flexing of the sleeve in response to a pressure of substantial magnitude developed in the chamber 20. In the present instance, the sleeve is composed of hardened steel about 1/16th of an inch thick. Under the proper pressure, the sleeve is expanded radially and uniformly far enough to take up the normal clearance, usually about .001 of an inch, between the outside and inside diameters of the sleeve and cutter body.

The chamber 20 is filled with liquid which as above defined is relatively noncompressible but flowable when placed under the required pressure for expanding the sleeve by sliding a piston 25 in a cylinder 26 formed within the shank member 9 inwardly beyond the plug 19. Among the suitable liquids are oil such as commonly used in machine tool hydraulic systems, grease, some kinds of flowable plastics, etc.

The piston 25 is held against turning in the cylinder by a cross-pin 27 secured to the shank member and projecting through a longitudinally extending slot 28 in the inner end portion of the piston. The escape of liquid past the piston is prevented by a seal ring 29.

A tubular extension or rod 30 integral with the piston projects outwardly and telescopes closely in a bore 31 in the inner end portion of the plug 19. Thus, the piston 25, the cylinder 26, the rod 30 and the inner end of the plug define an annular space 33 which is sealed closed by the ring 29 and a similar ring 34 around the piston rod. Outwardly opening grooves 35 extending along the inner end of the plug and across the flange 17 establish continuous communication between the chamber 20 and the space 33. The latter and the chamber 20 may be filled with a liquid through a hole 36 extending radially through the shank member 9 and closed by a threaded plug 37.

It will be apparent that as the piston 25 is pulled outwardly upon the cylinder, liquid will be forced out of the space 33 into the chamber 20 thus building up the pressure therein so as to flex the sleeve 14 outwardly and thus take up the narrow clearance between the latter and the wall of the bore 15. This pressure is exerted uniformly over the entire peripheral area of the sleeve which is thus expanded uniformly so as to center the cutter body rigidly and accurately on the mandrel axis in spite of the slight clearance needed to enable the cutter to be slid onto and off from the sleeve while the latter is not subjected to the expanding pressure.

Such outward sliding of the piston 25 and hydraulic expansion of the sleeve is produced by an actuator which is enclosed within the mandrel and is also utilized to derive an axially directed force for clamping the cutter body tightly against the shoulder 16 on the mandrel. The latter force is exerted on the outer end of the cutter body through an abutment formed in this instance by a washer 39. Preferably, both forces are derived by a screw and nut mechanism centered on the mandrel axis and herein comprising a screw 40 extending through the washer 39 and threaded at its inner end into the bore of the piston rod 30. A head 41 on the outer end of the screw abuts against the washer and is recessed to receive a tool by which the screw can be turned in opposite directions.

To mount a cutter on the mandrel, the screw 40 is turned counter-clockwise and removed from the plug 19. After the cutter body is slid onto the projecting sleeve 14, the screw is projected through the washer and turned into the plug thread. Since the chamber 20 and the space 33 are closed and filled with noncompressible liquid, the piston 25 remains in a fixed axial position until the screw head 41 comes against the washer 39 and presses the latter against the cutter and the cutter against the shoulder 16. Thereafter, continued turning of the screw is accompanied by increasing the clamping pressure on the cutter and by outward movement of the piston 25. As a result, some of the liquid in the space 33 is forced through the groove 35 into the chamber 20. The movement of the piston is thus converted into outward radial flexing of the sleeve 14 until the clearance between the latter and the bore 15 is taken up. The cutter body thus becomes centered accurately on the mandrel axis and supported rigidly through the medium of the noncompressible liquid maintained under high pressure in the chamber 20.

To remove the cutter from the mandrel it is only necessary to turn the screw 40 reversely to first relieve the expanding pressure and then release the endwise clamping pressure. After removal of the screw, the cutter may be slid off of the sleeve.

It will be apparent from the foregoing that the mechanism provided for clamping a ring-shaped part to a mandrel is utilized to perform the additional function of exerting a uniformly distributed and radially directed force for taking up a small but needed clearance between the part and its support while centering the part accurately on the mandrel axis. As a consequence, the cutter is supported rigidly and located with greater accuracy than has been possible heretofore.

I claim as my invention:

1. For supporting a ring such as a cutter having a first bore of predetermined diameter extending axially therethrough, the combination of, a first tubular member rotatable about a predetermined axis and having a second bore opening outwardly at one end of the member, means defining an axially facing shoulder at said one end for abutting against said ring, a thin walled sleeve rigid with and projecting from said one end and adapted to telescope into said first bore, a second tubular member constituting a rigid extension of said member and telescoped within said sleeve to cooperate therewith and define a first annular chamber within said sleeve for holding hydraulic liquid, a second chamber for hydraulic liquid disposed within one of said members and in continuous communication with said first chamber, a piston slidable in said second chamber, an abutment larger than said sleeve engageable with the outer end face of said ring when the latter is telescoped on said sleeve, and a screw and nut mechanism connecting said abutment and said piston including an actuating element movable relative to said member in one direction first to press said abutment against said ring and clamp the latter against said shoulder and then move said piston in a direction to force liquid from said second chamber into said first chamber and thereby expand said sleeve against the wall of said first bore.

2. The combination defined in claim 1 in which said screw and nut mechanism includes a rod disposed within and extending along the axis of said first tubular member, and mating screw and nut elements operable during relative turning about said ring axis to first draw said abutment against said ring and clamp the latter against said shoulder and then, during continued turning after such clamping, drawing said piston outwardly along said second chamber to compress the liquid in said chambers and thereby expand said sleeve against the wall of said bore and center said ring accurately on the axis of said first member.

3. The combination as defined in claim 2 including means for holding said piston against turning relative to said first tubular member.

4. The combination as defined in claim 1 in which said tubular members are telescoped and threaded together at their adjacent ends.

5. The combination as defined in claim 1 in which the inner end of said sleeve is spaced axially and outwardly from said shoulder and said first tubular member is formed with a solid extension projecting into the inner end of said ring.

6. For supporting a ring such as a cutter having a first bore of predetermined diameter extending axially therethrough, the combination of, a tubular member rotatable about a predetermined axis and having a second bore opening outwardly at one end of the member, means defining an axially facing shoulder at said one end for abutting against said ring a thin walled sleeve rigid with and projecting from said one end and adapted to telescope into said first bore, means cooperating with said sleeve to define a first annular chamber within said sleeve for holding hydraulic liquid, a second chamber for hydraulic liquid in continuous communication with said first chamber, a piston slidable in said second chamber, an abutment larger than said sleeve engageable with the outer end face of said ring when the latter is telescoped on said sleeve, and mechanism connecting said abutment and said piston including an actuating element movable relative to said member in one direction to first press said abutment against said ring and clamp the latter against said shoulder and then move said piston in a direction to force liquid from said second chamber into said first chamber and thereby expand said sleeve against the wall of said first bore.

References Cited in the file of this patent

UNITED STATES PATENTS

| | | |
|---|---|---|
| 2,797,602 | Atherholt et al. | July 2, 1957 |
| 2,797,604 | Atherholt et al. | July 2, 1957 |
| 2,963,298 | Better et al. | Dec. 6, 1960 |

FOREIGN PATENTS

| | | |
|---|---|---|
| 534,854 | Belgium | Jan. 31, 1955 |